Figure 1:
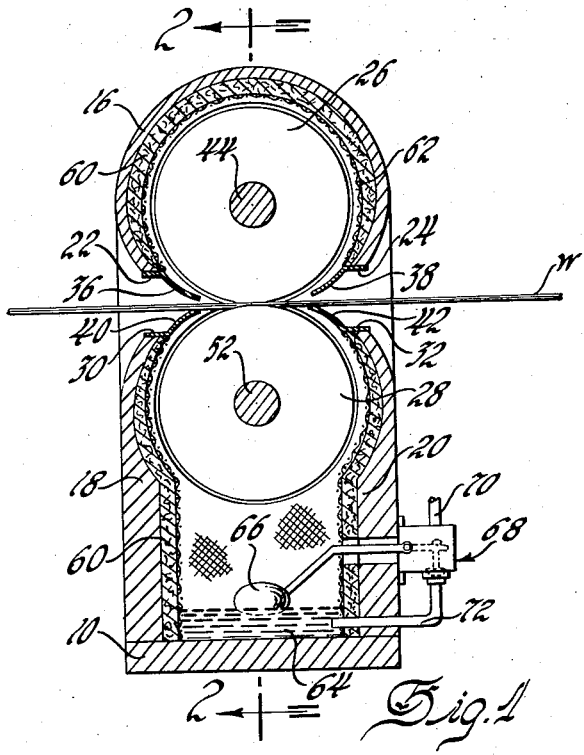

Dec. 2, 1958

J. A. NORTON 2,862,542

APPARATUS AND METHOD FOR CORRUGATING
RESIN-IMPREGNATED SHEET MATERIAL
Filed Aug. 24, 1955

INVENTOR
James A. Norton
BY
J. W. Lovett
ATTORNEY

United States Patent Office 2,862,542
Patented Dec. 2, 1958

2,862,542

APPARATUS AND METHOD FOR CORRUGATING RESIN-IMPREGNATED SHEET MATERIAL

James A. Norton, Flint, Mich., assignor to General Motors Corporation, Detroit, Mich., a corporation of Delaware Application August 24, 1955, Serial No. 530,297

6 Claims. (Cl. 154—30)

This invention relates to methods of and apparatus for corrugating sheet material and, more particularly, to methods of and apparatus for corrugating filter paper which has been preliminarily impregnated or treated with a resin.

In filtering lubricating oils as used in automotive engines it is often found expedient to use corrugated filter paper as a clarifying medium. The paper is corrugated to increase the area of contact with the oil and this is equivalent to increasing the capacity of the filter element. Corrugation also strengthens the paper against possible deformation and rupture under the strain imposed by the flowing oil. The paper is also treated, coated or impregnated with a resin to such an extent that its mechanical strength is further increased without adversely affecting the porosity or filtering capacity of the paper. The resin may be thermoplastic or of a thermosetting variety but, after it has hardened or polymerized, it definitely improves the filter paper to which it has been applied. After application the resin hardens and remains on or in the paper and is not displaced by the following oil during the filtering process. Sheet material treated with resin is disclosed in United States Letters Patent 2,103,572 granted December 28, 1937, in the name of D. H. Wells. A difficulty has arisen in that while the resin treated paper is best corrugated by passing it through the bite of corrugating rolls having surfaces properly undulated and meshed for the purpose, the resin adheres to the rolls necessitating periodic cleaning of the rolls. A build-up of resin obviously detracts from the quality of work performed as well as drastically reduces the production rate.

An object of the present invention is to provide an improved method of corrugating sheet materials treated with resin, the latter normally tending to adhere to surfaces with which the sheet materials and resin come in contact. Another object is to provide apparatus for corrugating sheet material such as resin treated filter paper and which will not unduly remove resin from the sheet material during the corrugation process.

A feature of the invention is a method of corrugating resin treated sheet material such as filter paper by means of rolls or surfaces simultaneously with a subjection of at least one of the rolls or surfaces with vapor composed of a solvent for the resin.

Another feature of the invention is an apparatus including meshed corrugating rolls in combination with means for applying a resin-solvent vapor to the roll surfaces.

These and other important features of the invention will now be described in detail in the specification and then pointed out more particularly in the appended claims.

Figure 2:
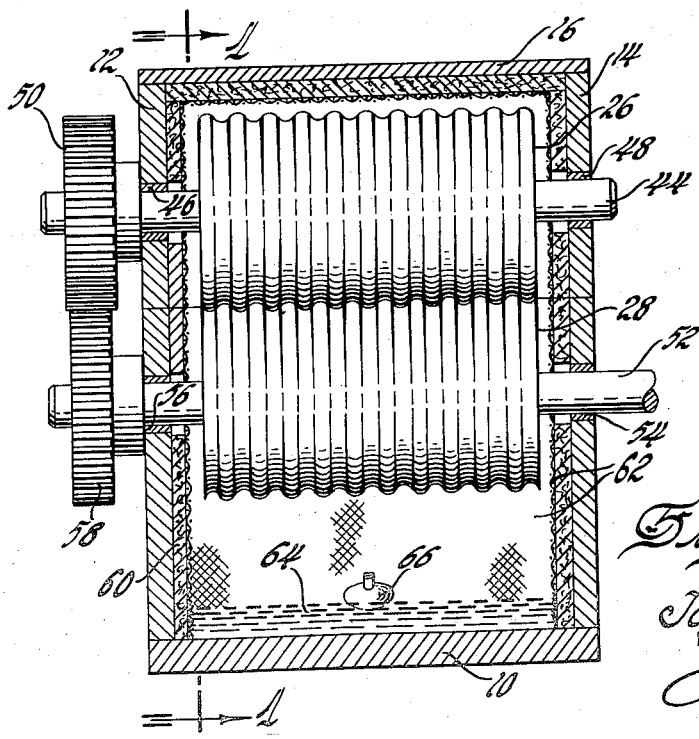

In the drawings,

Fig. 1 is a sectional view taken along the line 1—1 of Fig. 2 and diagrammatically illustrating one form of apparatus embodying features of the present invention; and Fig. 2 is a sectional view taken along the line 2—2 of Fig. 1.

It will be realized that many variations in structure of apparatus employed and also in specific manner of application of the method may be employed or selected without departing from the principles of the present invention.

The outside casing of the apparatus includes a bottom or base plate 10, end walls 12 and 14, an arcuate top wall 16 and lower partially arcuate walls 18 and 20. The top wall 16 curves downwardly and inwardly to terminate at points 22 and 24 and in a plane just above the bite of two rolls 26 and 28 mounted for rotation within the casing. The wall portions 18 and 20 extend upwardly and inwardly to terminate at points 30 and 32 which are in a plane located a short distance below the bite of the rolls. Conveniently, the casing may comprise rather thick walls and, in order that the chamber defined by the casing should not be unduly in communication with the atmosphere, metal lip portions 36, 38, 40 and 42 are employed. These metal portions are rigidly fastened to the casing by means not shown and are so placed with respect to the bite of the rolls that a very narrow passage or slot is determined by them at each side of the apparatus for the passing of work W.

The roll 26 is carried and fixed on a shaft 44 rotatably mounted in bearings 46 and 48 retained by the casing. The generally cylindrical surface of the roll 26 is provided with annular grooves and ridges conforming with corrugations to be made in the sheet material to be treated. One end of the shaft 44 is provided with a gear 50 rigidly affixed thereto and located outside the casing.

The roll 28 is mounted on a shaft 52 held within bearings 54 and 56 and connected to a gear 58 adapted to be driven by the gear 50.

The undulations formed by the grooves and ridges in the two rolls are such that the two rolls are in mesh and present proper clearance for the work W. It is also to be noted that the rolls are of such size and are so mounted within the casing that a substantial, free or clearance space exists at the ends of the rolls as well as around the curved surface thereof except at the bite, and even at the bite some clearance between rolls must be provided for permitting work passage. It will be appreciated that the rolls or one of the rolls may be resiliently mounted or adjustment means may be provided so that work of any desired thickness may be passed through the bite.

The casing is lined with a continuous layer of wicking 60 which extends upwardly from the base plate 10 and over the roll 26. This wicking is retained in a permanent position with respect to the casing and the rolls by means of wire mesh 62 so placed as to retain the wicking clear of the rolls. It will be noted that edges of the wicking terminate at points 22, 24, 30 and 32 above and below the passage for the work W, but continuity for the wicking is provided nevertheless as the casing work slots do not extend to the ends of the casing as will be understood.

The casing is made liquid tight and a bath of resin solvent 64 is retained on the base plate 10. An adequate supply or top level of this solvent is maintained by use of a float 66 controlling a valve apparatus 68 whereby solvent from a supply line 70 may be introduced as needed to the casing through a conduit 72. By the term "resin solvent," as used herein, it is intended to include any volatile liquid which will serve as a solvent or diluent for the resin before the latter is set or hardened. Preferably, the solvent is as volatile or more volatile than any solvent already in the impregnant or coating on the work.

In operation of the apparatus and carrying out of the method, the sheet material W is presumed to be treated in a preliminary step with a resin either by coating or by impregnation to an extent to form a suitably strengthened filtering medium for a given use. Before the resin on the paper or sheet material has become hardened or set— i. e.—when it is soft, it possesses an adhesive characteristic which normally would cause it to build up on the rolls 26 and 28. In the present instance, however, the solvent from the bath 64 rises up by virtue of the wicking 60 and the air in the casing becomes laden with the solvent vapor and wets the surfaces of the rolls to such an extent that if any resin does adhere to one of the rolls it is diluted or dissolved and retransferred to the sheet material W. Build-up of resin on the rolls is thereby prevented and the corrugation operation may be carried on without interruption.

It will be appreciated that various resins may be used depending upon the particular use intended for the product. It will also be appreciated that the corrugations may not be curved as shown in Fig. 2 of the drawings but, if desired, the undulations in the rolls may be of any desired shape, such as with relatively sharp angles to form creases in the sheet material or work. If desired, means for heating the bath of solvent 64 may be provided more fully to saturate the inside atmosphere of the casing with vapor. The wetting of the roll surfaces may be enhanced by cooling the rolls with a cooling medium circulated therein. The wicking 60 may be of felt, batt, burlap or other absorbent material and, as stated, should be held clear of moving parts. Fans may be employed to aid in circulating the air and vapor within the housing and, obviously, the corrugating rolls may be mounted at any angle other than horizontal as shown.

I claim:

1. Apparatus for corrugating sheet material comprising a casing, a pair of rolls presenting a bite between them and having meshed undulations and supported for rotation in said casing, work inlet and outlet slots in said casing and in alignment with the bite of said rolls, the edges of said casing defining said slots being close up to said bite, and means for applying a resin solvent vapor to the surfaces of said rolls.

2. Apparatus for corrugating sheet material comprising a casing, a pair of meshing work corrugating rolls in said casing, means for rotatably supporting said rolls on horizontal axes to admit work through the bite thereof, and means for applying a resin solvent vapor to the upper surface of the upper roll from a supply of solvent liquid beneath the lower roll.

3. Apparatus for corrugating sheet material comprising a casing, a pair of meshing work corrugating rolls supported for rotation in said casing, work inlet and outlet slots in said casing in alignment with the bite of said rolls, a bath of resin solvent in said casing, and an absorbent wicking in contact with said bath and extending into spaced but adjacent relation with each of said rolls to aid in transferring said solvent to the latter.

4. A method of corrugating sheet material comprising the steps of passing resin treated sheet material through the bite of and in contact wtih corrugating rolls while the resin is soft and simultaneously subjecting the surfaces of said rolls to the vapor of solvent for said resin thereby preventing adherence of resin to the rolls.

5. A method of corrugating filter paper which is treated with resin comprising the steps of feeding said paper in one direction and simultaneously corrugating said paper before the resin is hardened by subjecting the paper to pressure between opposed surfaces to one of which said resin would normally adhere and wetting said one surface during said feeding and corrugating with a vapor of a solvent for said resin to prevent undue resin adherence to said one surface and to said paper.

6. A method of corrugating filter paper which comprises the steps of rotating a pair of rolls in opposite directions with meshed surfaces, bathing said rolls in vapor of a resin solvent, and passing filter paper treated with said resin through the bite of said rolls and in contact with said surfaces in the presence of said vapor whereby adherence of resin to the said surfaces is prevented.

References Cited in the file of this patent

UNITED STATES PATENTS

| | | |
|---|---|---|
| 1,337,625 | Tarras | Apr. 20, 1920 |
| 1,473,096 | Hill et al. | Nov. 6, 1923 |
| 1,483,452 | Keyes | Feb. 12, 1924 |
| 2,090,369 | Liebowitz | Aug. 17, 1937 |
| 2,271,192 | Hinz | Jan. 27, 1942 |
| 2,281,646 | Whitehead | May 5, 1942 |
| 2,429,482 | Munters | Oct. 21, 1947 |
| 2,547,880 | Meyer et al. | Apr. 3, 1951 |
| 2,556,011 | Swayze et al. | June 5, 1951 |
| 2,624,068 | Dobry | Jan. 6, 1953 |
| 2,717,423 | Uhlig et al. | Sept. 13, 1955 |